June 11, 1940.    G. WÜNSCH    2,204,460
MOTION TRANSMISSION SYSTEM
Filed July 30, 1937
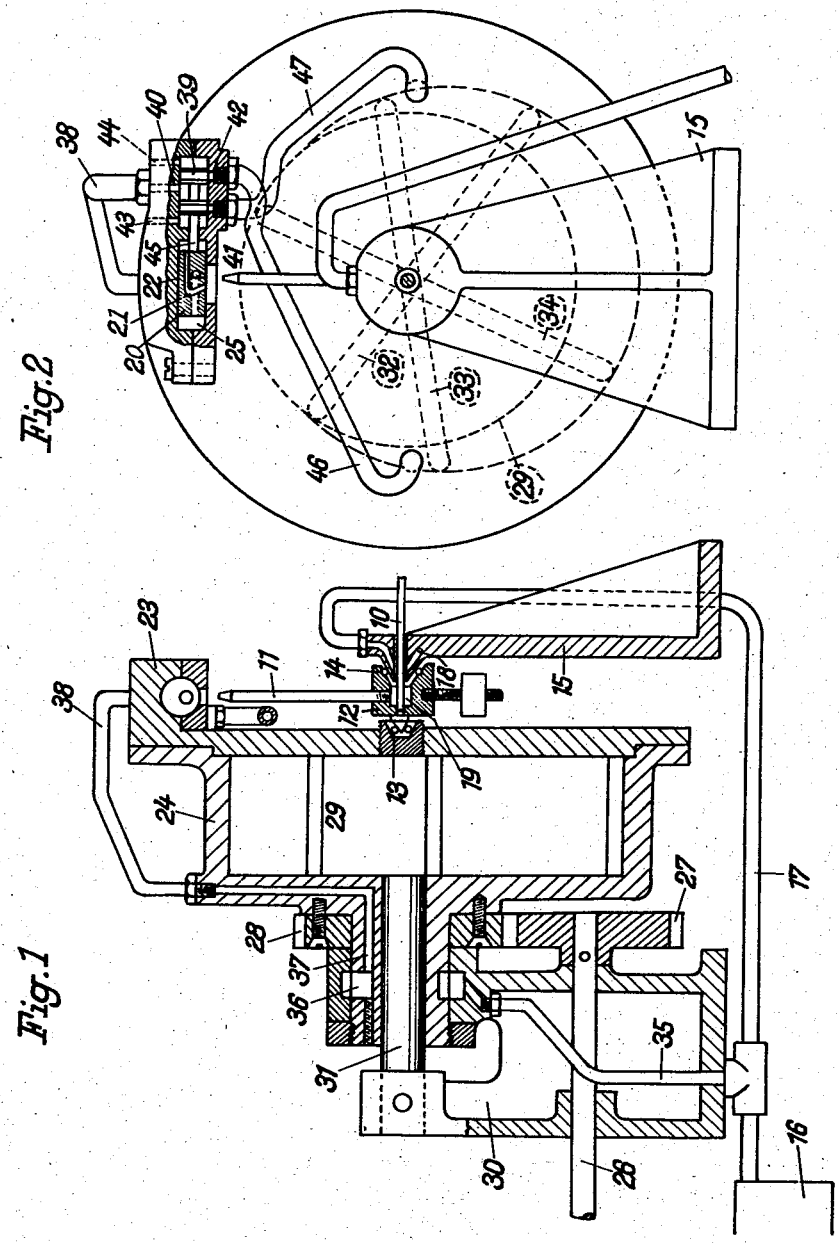
Inventor:
Guido Wünsch Patented June 11, 1940

2,204,460

UNITED STATES PATENT OFFICE 2,204,460

MOTION TRANSMISSION SYSTEM

Guido Wünsch, Berlin-Steglitz, Germany, assignor to Askania-Werke A. G., a corporation of Germany Application July 30, 1937, Serial No. 156,573
In Germany August 1, 1936

7 Claims. (Cl. 121—41)

This invention relates to motion transmission systems.

It is an object of this invention to provide a simple and reliable apparatus for converting a relatively weak rotary impulse, such as exerted by a pointer of a measuring instrument into a relatively strong rotary movement suitable for operating control mechanisms and the like.

It is a further object of this invention to provide an instrument by which even sudden rotary movements are correctly reproduced without the loss of one or several revolutions which sometimes occur in conventional repeater systems when a motion repeating element of relatively great inertia is not able simultaneously to follow quick movements introduced into the instrument.

Further aims, objects and advantages of this invention will appear from a consideration of the description which follows with the accompanying drawing showing for purely illustrative purposes an embodiment of this invention. It is to be understood, however, that the description is not to be taken in a limiting sense, the scope of the invention being defined in the appended claims.

Referring to the drawing:

Fig. 1 is a sectional sight elevation of an embodiment of this invention,

Fig. 2 is a front elevation, partly in section, of the instrument shown in Fig. 1.

A primary rotary impulse is introduced into the apparatus by means of a shaft 10 actuating a primary element of a first pressure fluid relay. In the illustrated example a pressure fluid relay of the well known "Askania" jet-pipe type is shown. The relay includes a movable jet-pipe 11 having a hub 12 and mounted for full rotation in anti-friction bearings 13 and 14 relatively to a fixed support 15. Pressure fluid is supplied to the jet-pipe from a pump diagrammatically shown at 16 through a conduit 17 terminating into an annular nozzle 18 surrounding the shaft 10 and issuing pressure fluid into a central bore 19 of the hub 12.

The secondary element of the pressure fluid relay is mounted for full rotation coaxially to the primary element. In the illustrated example a piston-shaped orifice member 20 having orifice conduits 21 and 22 is mounted for rotary movement with a rotatable casing 23, 24 of a motor later to be described. The orifice member 20 is slidably mounted in a bore 25 of said casing. When pressure fluid enters one or the other of the reception orifices, a pressure is set up inside the bore 25 and the piston-shaped orifice member is moved into the corresponding extreme position relatively to the casing 23, 24.

A rotary pressure fluid motor shown in the illustrated example as being of the slide vane type is used to reproduce the primary motion impulse by turning a power shaft 26 in a suitable manner, such as by means of gears 27 and 28 actuated by the rotatable part of the motor.

In the illustrated example the motor includes a slide vane member 29 mounted to be stationary in a support 30 by means of a shaft 31 secured thereto. The slide vane member carries in slots the usual slide vanes 32, 33 and 34 forming pressure fluid chambers with an excentrically shaped hollow interior space of the motor casing 23, 24. The motor casing is rotatable about the shaft 31, thus driving the power shaft 26 by means of the gears 27 and 28.

Pressure fluid is supplied to the motor through a conduit 35 terminating in a ring-shaped space 36 of the support 30 and the casing 24 and thence through a passage 37 and a pipe 38 to a second pressure fluid relay 39.

The second pressure fluid relay is shown in the example as being of the slide valve type admitting pressure fluid from a supply port 40 to control ports 41 and 42 and further controlling exhaust ports 43 and 44.

The second relay is connected to be actuated by the first pressure fluid relay, in the example by virtue of its being connected to the orifice member 20 by means of a stem 45. From the control ports 41 and 42 pressure fluid is admitted to the interior of the casing 24 through the conduits 46 and 47, respectively.

The operation of the motor will be easily understood from the following explanation referring more particularly to Fig. 2. When the slide valve 39 is moved into the left position, the supply conduit is connected to supply pressure fluid through the conduit 46 into the interior of the motor casing. On the other hand, the conduit 47 communicates with the exhaust port 44. In case of a rotatably mounted slide vane member 29 pressure fluid entering through the conduit 46 would cause the slide vane member with the slide vanes to move counterclockwisely relatively to the motor casing 24, while the used pressure fluid is permitted to escape through the conduit 47. Inasmuch as the slide vane member is mounted to be stationary, it follows that the casing 24 will move relatively to the slide vane members in a clockwise direction thereby driving the power shaft 26.

The operation of the entire device is as follows:

A primary rotary impulse applied to the shaft 10 will displace the jet-pipe relatively to the reception orifice member 20 in one direction or the other. The slide valve 39 will thereupon admit pressure fluid through conduits 46 or 47 and cause the motor casing to follow the position of the jet-pipe. It appears that in this manner the primary motor is exactly reproduced by the movements of the motor with a force sufficient to operate control mechanisms or the like.

When, caused by a sudden primary impulse, the jet-pipe is moved quickly relatively to the orifice member without the motor being able to follow instantaneously, due to its inertia or the inertia of the device operated by the motor, no movement will be lost, since the second relay, the valve 39, the inertia of which being much less than that of the motor follows immediately the movement of the jet-pipe and remains in the extreme position, causing the motor to turn, until the motor casing catches up with the jet-pipe and the second relay is moved back into its neutral position.

Obviously, the present invention is not restricted to the particular embodiment herein shown and described. Moreover, it is not indispensable that all the features of this invention be used conjointly since they may be used advantageously in various combinations and sub-combinations.

What is claimed is:

1. Motion transmission system comprising, in combination, a rotary pressure fluid motor; a jet-pipe relay including a jet-pipe mounted for full rotations about an axis coaxial with the motor and a reception orifice member mounted for full rotations with the motor; a valve controlling the flow of pressure fluid to the motor; and means controlled by said jet-pipe relay for operating said valve.

2. Motion transmission system comprising, in combination, a jet-pipe relay including a jet-pipe mounted for full rotations about an axis and a reception orifice member mounted for full rotations coaxially thereto; a rotary pressure fluid motor connected to rotate said reception orifice member; and a slide valve relay mounted for rotation with said motor and actuated by said jet-pipe relay for controlling a flow of pressure fluid for actuating said motor, whereby said motor is caused to repeat the movements of said jet-pipe.

3. Motion transmission system comprising, in combination, a slide vane motor including a fixed slide vane member and a casing rotatably mounted around said member; a first pressure fluid relay including a primary relay member mounted for full rotations coaxially to said motor casing, and a secondary relay element mounted on said casing to rotate with it; and a second pressure fluid relay mounted for rotation with said motor and actuated by said first relay for controlling a flow of pressure fluid for actuating said motor, whereby said motor is caused to follow the positions of said primary relay member.

4. Motion transmission system comprising, in combination, a slide vane motor including a fixed slide vane member and a casing rotatable relatively thereto; a jet-pipe relay including a jet-pipe mounted for full rotations coaxially to said motor casing, and a reception orifice member mounted for movement with said motor casing; and a slide valve relay mounted for rotation with said motor casing and actuated by said jet-pipe relay for controlling a flow of pressure fluid for actuating said motor, whereby said motor is caused to repeat the movements of said jet-pipe.

5. Motion transmission system comprising, in combination, a slide vane motor including a fixed slide vane member and a casing rotatable relatively thereto; a jet-pipe relay including a jet-pipe mounted for full rotations coaxially to said motor casing, and a piston-shaped orifice member slidably mounted on said motor casing, said orifice member being arranged to be displaced relatively to said casing in response to the fluid pressure set up in its orifices; and a slide valve relay mounted on said casing and connected to be actuated by said orifice member for controlling a flow of pressure fluid for actuating said motor, whereby said motor is caused to repeat the movements of said jet-pipe.

6. Motion transmission system comprising, in combination a pressure fluid relay including a primary relay element mounted for full rotations about an axis and a secondary relay element mounted for full rotations coaxially to said first element; a rotary pressure fluid motor including two parts, a casing and a piston member therein, one of said two parts being rotatably mounted for continuous rotation in either direction; and a second pressure fluid relay actated by said first relay for controlling a flow of pressure fluid for actuating said motor, said secondary relay element of said first relay and said second relay being mounted on said rotatable motor part.

7. Motion transmission system comprising, in combination, a jet-pipe relay including a jet-pipe mounted for full rotations about an axis transverse to the direction of the jet and a reception orifice member mounted for full rotations coaxially thereto; and a rotary pressure fluid motor including two parts, a casing and a piston member therein, one of said two parts being rotatably mounted for continuous rotation in either direction, said motor being actuated by a flow of pressure fluid controlled by said jet-pipe, said reception orifice member being mounted on said rotatable motor part to follow-up the movement of the jet-pipe.

GUIDO WÜNSCH.